(12) United States Patent
Yamada

(10) Patent No.: US 7,002,547 B2
(45) Date of Patent: Feb. 21, 2006

(54) BACKLIGHT CONTROL DEVICE FOR LIQUID CRYSTAL DISPLAY

(75) Inventor: Atsushi Yamada, Nagaya (JP)

(73) Assignee: Seiko Epson Corporation, Tokyo (JP)

( * ) Notice: Subject to any disclaimer, the term of this patent is extended or adjusted under 35 U.S.C. 154(b) by 435 days.

(21) Appl. No.: 10/349,162

(22) Filed: Jan. 22, 2003

(65) Prior Publication Data

US 2003/0169226 A1    Sep. 11, 2003

(30) Foreign Application Priority Data

Jan. 23, 2002    (JP) .............................. 2002-014604

(51) Int. Cl.
*G09G 3/36*    (2006.01)
(52) U.S. Cl. ....................... 345/102; 345/82
(58) Field of Classification Search ............ 345/77–88, 345/87–90, 99–102, 39, 46, 690; 315/169.3; 396/55, 97, 98, 108
See application file for complete search history.

(56) References Cited

U.S. PATENT DOCUMENTS

| | | | | |
|---|---|---|---|---|
| 6,069,449 A | * | 5/2000 | Murakami | ................... 315/158 |
| 6,122,447 A | * | 9/2000 | Washisu | ....................... 396/55 |
| 6,388,388 B1 | * | 5/2002 | Weindorf et al. | ......... 315/169.3 |
| 6,608,614 B1 | * | 8/2003 | Johnson | ....................... 345/102 |
| 6,744,416 B1 | * | 6/2004 | Mizutani et al. | .............. 348/88 |
| 6,888,529 B1 | * | 5/2005 | Bruning et al. | .............. 345/102 |
| 2003/0011625 A1 | * | 1/2003 | Kellis | .......................... 345/690 |

FOREIGN PATENT DOCUMENTS

| | | |
|---|---|---|
| JP | 02-053040 | 2/1990 |
| JP | 08-114801 | 5/1996 |
| JP | 2000-324239 | 11/2000 |
| JP | 2001-265294 | 9/2001 |
| JP | 2002-111865 | 4/2002 |
| JP | 2002-344598 | 11/2002 |
| JP | 2002-344778 | 11/2002 |
| JP | 2003-021821 | 1/2003 |
| JP | 2003-161926 | 6/2003 |

* cited by examiner

*Primary Examiner*—Ricardo Osorio
*Assistant Examiner*—Mansour M. Said
(74) *Attorney, Agent, or Firm*—Hogan & Hartson, L.L.P.

(57) ABSTRACT

A backlight control device for a liquid crystal display includes a light emitting diode (LED) driving circuit that is connected to a power supply circuit and drives the LED, and a current control device that detects brightness around the liquid crystal display and controls a driving current for the LED according to the detected brightness.

13 Claims, 9 Drawing Sheets

BACKLIGHT CONTROL DEVICE FOR LIQUID CRYSTAL DISPLAY

BACKGROUND OF THE INVENTION

1. Field of the Invention

The present invention relates to a liquid crystal display that is of a transmissive type or of a transreflective type liquid crystal display equipped with LEDs (light emitting diodes) as a backlight, and a backlight control device for the liquid crystal display for controlling the amount of light emission of the LEDs.

2. Description of the Related Art

Conventionally known liquid crystal displays include a transmissive type liquid crystal display having a liquid crystal device and a backlight such as a fluorescent lamp, LEDs or the like are disposed at the back of the liquid crystal device, which displays through irradiating light from behind the liquid crystal device. Other known liquid crystal displays include a reflective type liquid crystal device which displays through reflecting light such as natural light, room light or the like and a transreflective (half-transmissive) type liquid crystal display which displays through the use of a transmissive type in combination with a reflective type.

In this manner, transmissive type and transreflective type liquid crystal displays use for example an LED as a backlight. When the liquid crystal display is used, a drive current is applied to the LED without regard to the brightness around the liquid crystal panel to drive the LED.

For this reason, when the surrounding area of the panel is bright, the current applied to the LED may be more than necessary, which deteriorates the viewability of the liquid crystal panel. Moreover, when a battery is used as a driving power supply for the LED, there is a problem in that the battery quickly discharges.

In the meantime, conventionally, a drive current is applied to the LED without regard to the ambient temperature around the liquid crystal panel to drive the LED.

However, when the ambient temperature around the liquid crystal panel changes, the temperature of the LED changes accordingly. For this reason, the luminance factor of the LED changes due to the change in the temperature of the LED in use, and therefore the LED cannot achieve an optimum luminance factor. As a result, there is a problem in that the energy of the power supply source such as the battery cannot be effectively utilized.

Moreover, when multiple LEDs are used and driven, and if the LEDs are simultaneously turned on, the drive peak current value becomes large. When the input power supply source is the battery, there is a problem in that the input voltage lowers according to the impedance of the battery, and the efficiency of the power supply section deteriorates.

Accordingly, in view of the problems discussed above, it is a first advantage of the present invention to provide backlight control device for a liquid crystal display in which, when a battery is used as the power supply source for the LED, upon using the liquid crystal display, the power consumption of the battery can be reduced, and the display quality of the liquid crystal panel can be improved.

Also, it is a second advantage of the present invention to provide a backlight control device for a liquid crystal display in which the power supply source for the LED can be used in an energy efficient manner upon using the liquid crystal display, and the display quality of the liquid crystal panel can be improved.

Furthermore, it is a third advantage of the present invention to provide a backlight control device for a liquid crystal display in which upon using the liquid crystal display, the display quality of the liquid crystal panel can be improved regardless of the differences in the brightness in the surroundings and differences in the ambient temperature.

SUMMARY OF THE INVENTION

To solve the problems discussed above and to achieve the first advantage of the present invention, a transmissive type or a transreflective type liquid crystal display equipped with an LED as a backlight, includes an LED driving circuit that is connected to a power supply circuit and drives the LED and a current control device that detects brightness around the liquid crystal display and controls a driving current for the LED according to the detected brightness.

The backlight control device for the liquid crystal display provides the current control device equipped with a control reference voltage generation circuit that generates a control reference voltage according to the brightness around the liquid crystal display, and an error amplifier circuit that generates a signal representing a difference between a detection voltage according to the driving current for the LED and the control reference voltage generated by the control reference voltage generation circuit. The power supply circuit varies an output voltage thereof according to an output of the error amplifier circuit.

The backlight control device for the liquid crystal display provides the control reference voltage generation circuit equipped at least with a current-voltage conversion circuit that converts a current that flows according to brightness around the liquid crystal display to a voltage, an amplification circuit that amplifies the voltage converted by the current-voltage conversion circuit, and a sample and hold circuit that samples and holds an output voltage of the amplification circuit.

Accordingly, the current that flows in the LED used as a backlight can be optimized without regard to the brightness of the surroundings when the liquid crystal display is used. For this reason, when a battery is used as a power supply source for the LED, the power consumption of the battery can be reduced, and the display quality of die liquid crystal panel can be improved.

Next, to achieve the second advantage, the invention provides a transmissive type or a transreflective type liquid crystal display equipped with an LED as a backlight including an LED driving circuit that is connected to a power supply circuit and drives the LED and a control reference voltage generation circuit that, for compensating for temperature dependency of luminescent brightness of the LED, generates a control reference voltage according to temperature characteristics of the luminescent brightness. The liquid crystal display also includes a voltage-current conversion circuit that converts the control reference voltage of the control reference voltage generation circuit to a predetermined current, wherein the LED driving circuit drives the LED by a driving current according to the predetermined current tat is converted by the voltage-current conversion circuit.

According to the invention, the control reference voltage generation circuit is composed of a band-gap reference circuit.

By the invention having such compositions as described above, upon using the liquid crystal display, without regard to differences in the temperature of the surroundings, the luminance factor of the LED for a backlight can be optimized. For this reason, a power supply source for driving the LED can be used in an energy efficient manner, and the display quality of the liquid crystal panel can be improved.

Next, to achieve the third advantage, the invention provides a transmissive type or a transreflective type liquid crystal display equipped with an LED as a backlight, including an LED driving circuit that is connected to a power supply circuit and drives the LED; a first current control device that detects brightness around the liquid crystal display and controls a driving current of the LED according to the detection; and a second current control device that, for compensating for temperature dependency of luminescent brightness of the LED, controls a driving current of the LED according to temperature characteristics of the luminescent brightness.

The first current control device is equipped with a first control reference voltage generation circuit that generates a first control reference voltage according to the brightness around the liquid crystal display, and an error amplifier circuit that generates a signal representing a difference between a detection voltage generated according to the drive current of the LED and the control reference voltage generated by the first control reference voltage generation circuit. The power supply circuit varies an output voltage thereof according to an output of the error amplifier circuit.

The second current control device is equipped with a second control reference voltage generation circuit that, for compensating for temperature dependency of luminescent brightness of the LED, generates a second control reference voltage according to temperature characteristic of the luminescent brightness of the LED, and a voltage-current conversion circuit that converts the second control reference voltage of the second control reference voltage generation circuit to a predetermined current. The LED driving circuit drives the LED by a driving current according to the predetermined current that is converted by the voltage-current conversion circuit.

The first control reference voltage generation circuit is equipped at least with a current-voltage conversion circuit that converts a current that flows according to the brightness around the liquid crystal display to a voltage, an amplification circuit that amplifies the voltage converted by the current-voltage conversion circuit, and a sample and hold circuit that samples and holds an output voltage of the amplification circuit.

The second control reference voltage generation circuit is composed of a band-gap reference circuit.

The invention further provides for a transmissive type or a transreflective type liquid crystal display equipped with an LED as a backlight, including an LED driving circuit that is connected to a power supply circuit and drives the LED and a control reference voltage generation circuit that is responsive to brightness around the liquid crystal display, and for compensating for temperature dependency of luminescent brightness of the LED, generates a control reference voltage according to temperature characteristic of the luminescent brightness. The invention also includes an error amplifier circuit that generates a signal representing a difference between a detection voltage generated according to a drive current of the LED and the control reference voltage generated by the control reference voltage generation circuit; and a voltage-current conversion circuit that converts the control reference voltage to a predetermined current. The power supply circuit varies an output voltage thereof according to an output of the error amplifier circuit, and the LED driving circuit drives the LED by a driving current according to the predetermined current that is converted by the voltage-current conversion circuit.

The control reference voltage generation circuit is equipped at least with a current-voltage conversion circuit that converts a current that flows according to the brightness around the liquid crystal display to a voltage, and an amplification circuit that amplifies the voltage converted by the current-voltage conversion circuit. The invention further includes a sample and hold circuit that samples and holds an output voltage of the amplification circuit, and a band-gap reference circuit that generates a temperature-dependent reference voltage. Outputs of the respective current-voltage conversion circuit, the amplification circuit and the sample and hold circuit are changed according to the reference voltage generated by the band-gap reference circuit.

The present invention provides a transmissive type or a transreflective type liquid crystal display equipped with LEDs as a backlight including a plurality of LED driving circuits that are connected to a power supply circuit and drive the corresponding respective plurality of LEDs and a control-reference voltage generation circuit that is responsive to the brightness around the liquid crystal display, and for compensating for temperature dependency of luminescent brightness of the of the LEDs, generates a control reference voltage according to temperature characteristics of the luminescent brightness. The invention also includes a control reference voltage level conversion circuit that converts the control reference voltage generated by the control reference voltage generation circuit to a lower level voltage and outputs the same; an error amplifier circuit that generates a signal representing a difference between each detection voltage generated according to each drive current of each of the LEDs of the respective LED driving circuits; and a plurality of current control circuits that each converts the control reference voltage converted by the control reference voltage level conversion circuit to a predetermined current, and controls the drive current of each of the LEDs of the respective LED driving circuits to assume the predetermined current. The power supply circuit varies an output voltage thereof according to an output of the error amplifier circuit.

The control reference voltage generation circuit is equipped at least with a current-voltage conversion circuit that converts a current that flows according to brightness around the liquid crystal display to a voltage and an amplification circuit that amplifies the voltage converted by the current-voltage conversion circuit. The control reference voltage generation circuit also includes a sample and hold circuit that samples and holds an output voltage of the amplification circuit, and a bond-gap reference circuit that generates a temperature-dependent reference voltage, wherein outputs of the respective current-voltage conversion circuit. The amplification circuit and the sample and hold circuit are changed according to the reference voltage generated by the band-gap reference circuit.

The LEDs of the plurality of LED driving circuits are successively driven by drive signals having different phases.

By the invention having such compositions as described above, upon using the liquid crystal display, the display quality of the liquid crystal panel can be improved without regard to differences in brightness in the surroundings and differences in the ambient temperature.

Also, when the lighting of a plurality of LEDs is controlled with LED driving signals having different phases, the luminance factor at the time of driving the LEDs can be improved, and the currents for driving the LEDs by the power supply circuit can be leveled off.

DETAILED DESCRIPTION OF THE INVENTION

Embodiments of the present invention are described below with reference to the accompanying drawings.

A composition of a backlight control device for a liquid crystal display in accordance with a first embodiment of the present invention is described with reference to FIG. 1.

In a transmissive type or a transreflective type liquid crystal display in accordance with the first embodiment, the light emission amount of an LED disposed as a backlight at the back of its liquid crystal panel is controlled according to the brightness around the liquid crystal panel, and controlled such that the light emission amount is kept at a predetermined value even when the temperature of the LED in use changes.

Figure 1:
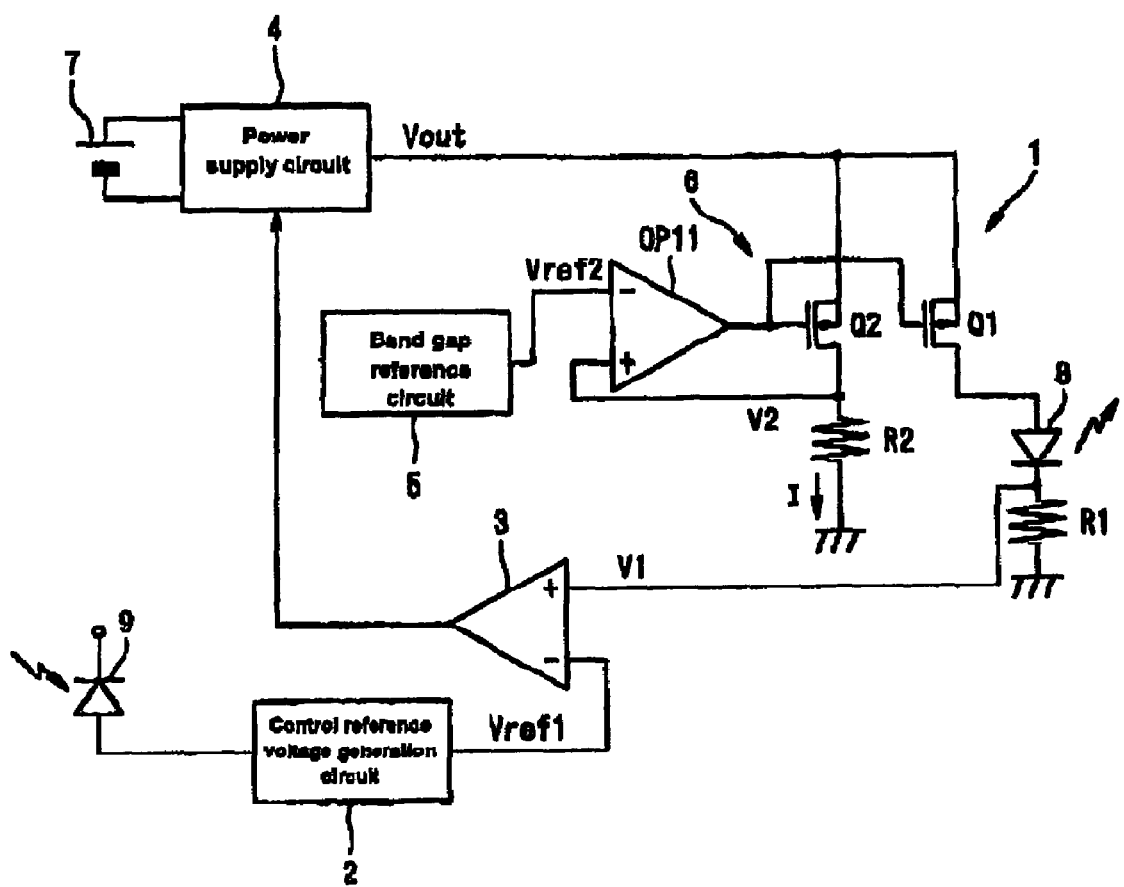
FIG. 1 shows a composition in accordance with a first embodiment of the present invention.

Accordingly, as shown in FIG. 1, the first embodiment of the present invention is equipped with an LED driving circuit 1, a control reference voltage generation circuit 2, an error amplifier circuit (error amplifier) 3, a power supply circuit 4, a band-gap reference circuit 5 and a voltage-current conversion circuit 6. The power supply circuit 4 is connected to a power supply 7 such as a constant voltage power supply.

Here, the control reference voltage generation circuit 2 and the error amplifier circuit 3 form a first current control device. Further, the band-gap reference circuit 5 and the voltage-current conversion circuit 6 form a second current control device.

The LED driving circuit 1, as indicated in FIG. 1, circulates a drive current through an LED 8 to have the LED emit light. Therefore, the LED driving circuit 1 is formed from a circuit in which a P-type MOS transistor Q1, the LED 8 and a resistance R1 are serially connected to one another, and one end thereof is connected to an output line of the power supply circuit 4 and another end thereof is grounded.

The control reference voltage generation circuit 2 is a circuit that generates a control reference voltage Vref1 according to the intensity of the brightness around the liquid crystal panel and outputs the same, which may be realized by using a light receiving diode 9.

Here, the light receiving diode is used as a visible light sensor. However, in addition to the light receiving diode, another light receiving element, such as, for example, a photoconductor or a phototransistor may also be used. The light receiving element to be used may have a high sensitivity to visible lights. Also, light receiving elements with a low sensitivity to ultraviolet rays and infrared rays may be preferred, but they may be provided with a structure in which a transmission preventing film is provided on a light receiving surface of each light receiving element.

Figure 4:
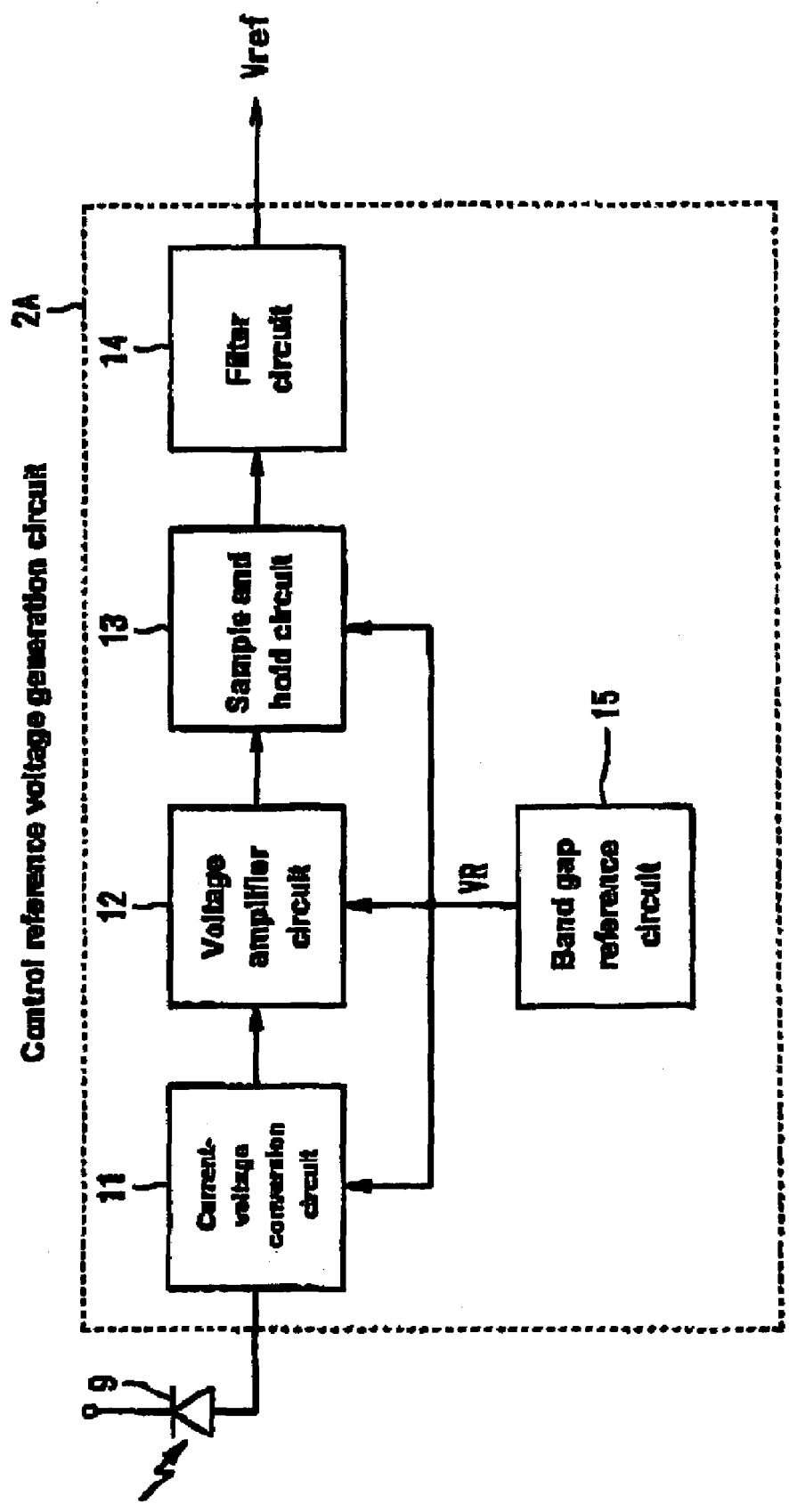
FIG. 4 is a block diagram of a specific composition of a control reference voltage generation circuit shown in FIG. 3.
Figure 5:
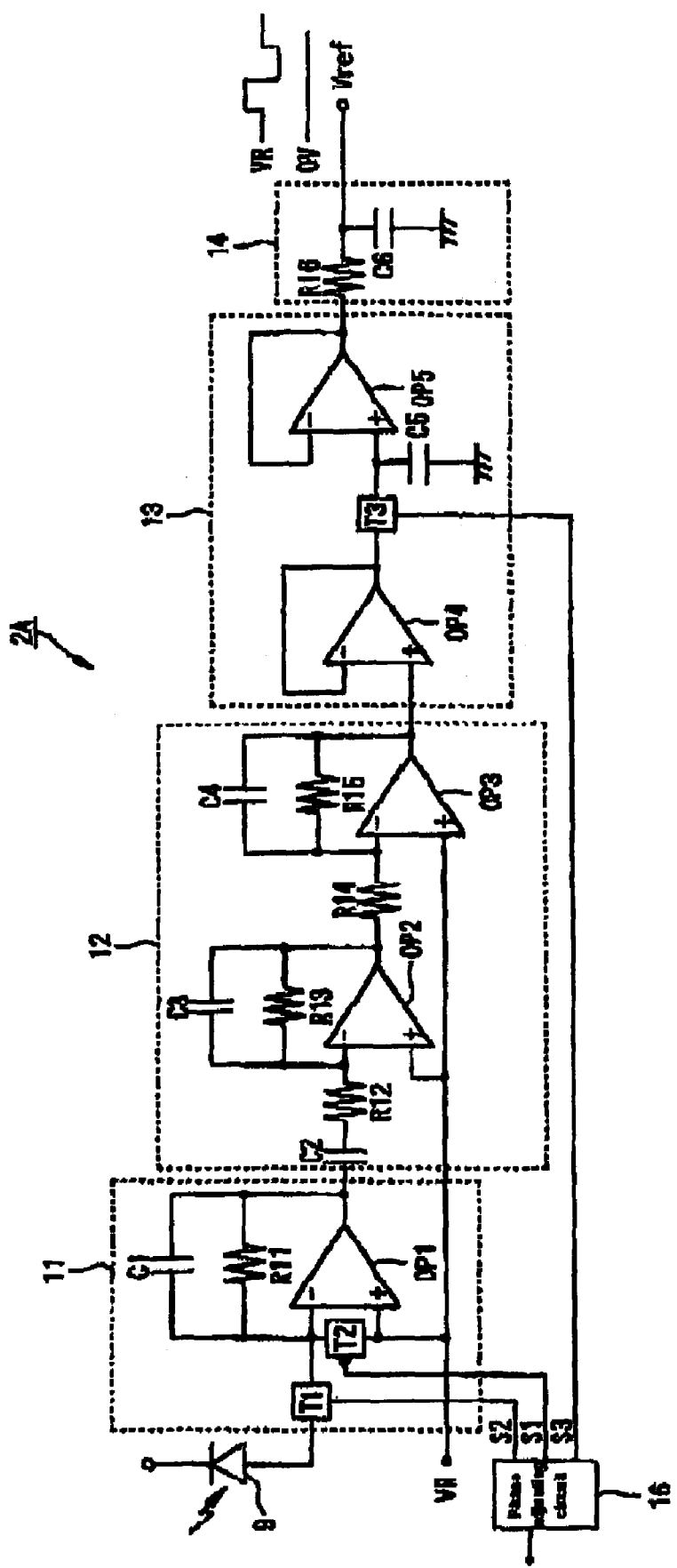
FIG. 5 is a circuit diagram of a specific composition of a control reference voltage generation circuit shown in FIG. 4.

It is noted that the control reference voltage generation circuit 2 may be structured in a manner star to a control reference voltage generation circuit 2A to be described below, as indicated in FIG. 4 and FIG. 5. However, a band-gap reference circuit 15 in the composition may be replaced with a reference voltage generation circuit that is capable of generating a predetermined reference voltage.

The error amplifier circuit 3 compares a detection voltage V1 is generated across both ends of the resistance R1 of the LED driving circuit 1 with the control reference voltage Vref1 that is generated by the control reference voltage generation circuit 2, and outputs a control signal for controlling a constant current that is supplied by the power supply circuit 4 such that the detection voltage V1 coincides with the control reference voltage Vref1.

The power supply circuit 4 is composed of, for example, a charge pump type DC-DC converter whose step-up power is varied depending on inputted voltages to step up the voltage of the power supply 7 to an appropriate voltage. This voltage is retrieved as an output voltage Vout. Also, the power supply circuit 4 controls, based on an output from the error amplifier circuit 3, its output voltage Vout such that the detection voltage V1 generated across both ends of the resistance R1 coincides with the control reference voltage Vref1.

Figure 2:
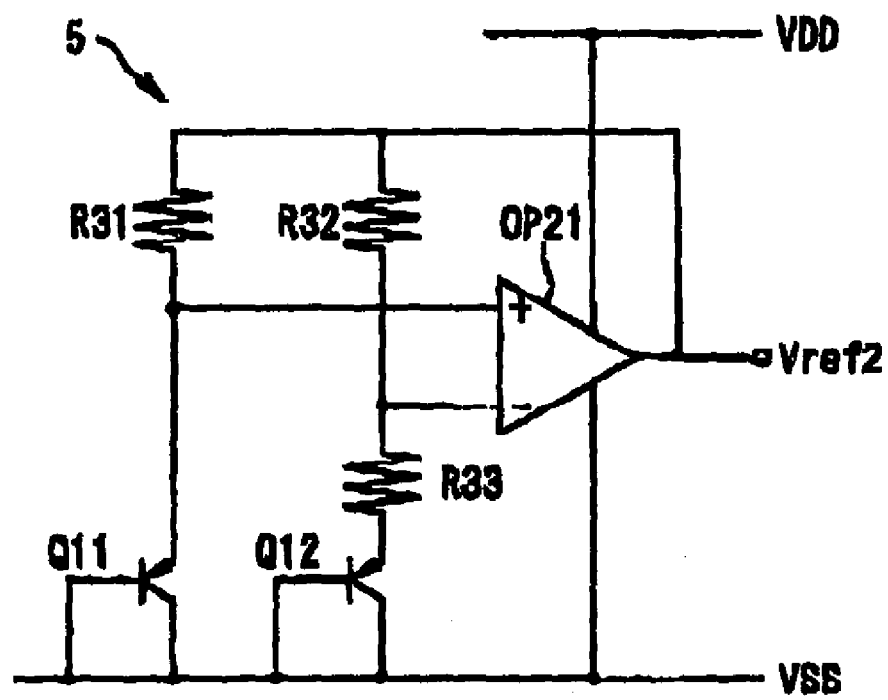
FIG. 2 is a circuit diagram of a specific composition of a band-gap reference circuit shown in FIG. 1.

The band-gap reference circuit 5 is a circuit that is provided, for compensating for temperature dependency of luminescent brightness of the LED 8, to generate a control reference voltage Vref2 according to the temperature dependency of the LED, and may be composed of a circuit shown in FIG. 2, for example.

The voltage-current conversion circuit 6 is a circuit that converts the control reference voltage Vref2 generated by the band-gap reference circuit 5 into a predetermined constant current, and functions as a constant current source whose constant current is variable.

For this reason, the voltage-current conversion circuit 6 is composed of a P-type MOS transistor Q2, a resistance R2, and an operation amplifier OP11, and generates a constant current I=Vref2/R2 by utilizing the fact that the control reference voltage Vref2 applied to a (−) input terminal of the operation amplifier OP11 is equal to a potential V2 at a common connection point between the MOS transistor Q2 and the resistance R2.

More specifically, the MOS transistor Q2 and the resistance R2 are serially connected between the output line of the power supply circuit and the ground. The control reference voltage Vref2 from the band-gap reference circuit 5 is applied to the (−) input terminal of the operation amplifier OP11, and a (+) input terminal of the operation amplifier OP11 is connected to the common connection section between a source/drain of the MOS transistor and the resistance R2.

Also, an output terminal of the operation amplifier OP11 is connected to a gate of the MOS transistor Q2. Further, the gate of the MOS transistor Q2 is connected to a gate of the MOS transistor Q1 that composes the LED driving circuit 1.

In this manner, because the MOS transistor Q1 and the MOS transistor Q2 are in a relation of a current mirror, the current that flows in the MOS transistor Q1 follows the constant current I that flows in the MOS transistor Q2.

Next, a specific composition of the band-gap reference circuit 5 indicated in FIG. 1 is described with reference to FIG. 2.

The band-gap reference circuit 5, as shown in FIG. 2, is composed of an operation amplifier Q21, resistances R31–R33 and PNP-type transistors Q11 and Q12.

More specifically, the resistance R31 and the transistor Q11 are serially connected, and one end of the resistance R31 is connected to an output terminal of the operation amplifier OP21. The collector and base of the transistor Q11 are connected to a line of the power supply VSS. A common connection section of the resistance R31 and the transistor Q11 is connected to a (+) input terminal of the operation amplifier OP21.

Also, the resistance R32, the resistance R33 and the transistor Q12 are serially connected, and one end of the resistance R32 is connected to an output terminal of the operation amplifier OP21. The collector and base of the transistor Q12 are connected to a line of the power supply VSS. A common connection section between the resistance R33 and the resistance R32 is connected to a (−) input terminal of the operation amplifier OP21. A control reference voltage Vref2 is retrieved from the output terminal of the operation amplifier OP21.

With the band-gap reference circuit having the composition described above, the control reference voltage Vref2 that is outputted from the operation amplifier OP21 is defined by Expression (1) as follows:

$$Vref2 = Vbe1 + [1+(R32/R33)] \times (kT/q) \times 1\ nN \quad (1)$$

Where Vbe1 is a voltage in a forward direction between the base and the emitter of the transistor Q11, k is Boltzmann constant, T is absolute temperature, q is a charge of electrons, and N is the number of transistors (2 in this case).

(1) As understood from Expression (1), the control reference voltage Vref2 that is outputted from the operation amplifier OP21 has a temperature dependency. For this reason, by changing the resistance value of each of the resistances R31 and R32, the temperature dependency of the luminescent brightness of the LED 8 can be compensated.

Next, an example of operations of the first embodiment thus composed is described with reference to the accompanying drawings.

As shown in FIG. 1, since the MOS transistor Q2 of the voltage-current conversion circuit 6 and the MOS transistor Q1 of the LED driving circuit 1 compose a current mirror, a constant current flows in the MOS transistor Q1 according to the constant current I that flows in the MOS transistor Q2. As a result, the LED 8 is driven by the constant current.

In the first embodiment, the amount of light emission of the LED 8 is controlled according to the brightness around the liquid crystal panel, and the amount of light emission is also controlled to be at a predetermined value even though the temperature of the LED 8 in use changes accordingly. In this respect, the former control will be described first, and the latter control will be described later.

First, in the former control, the control reference voltage generation circuit 2 generates and output a control reference voltage Vref1 according to the degree of brightness around the liquid crystal panel (not shown).

For example, when the liquid crystal display is transreflective, the control reference voltage Vref1 is made lower than a normal voltage when the surroundings of the liquid crystal panel are brighter than an ordinary brightness. Conversely, the control reference voltage Vref1 is made higher than the normal voltage when the surroundings of the liquid crystal panel are darker than an ordinary brightness.

Also, the control reference voltage Vref1 can be used in the case of a front-light of a reflective type liquid crystal display. In this case, like the transreflective type liquid crystal display, the control reference voltage Vref1 is made lower than a normal voltage when the surroundings of the liquid crystal panel are brighter than an ordinary brightness. Conversely, the control reference voltage Vref1 is made higher than the normal voltage when the surroundings of the liquid crystal panel are darker than an ordinary brightness.

When the liquid crystal display is transmissive, the control reference voltage Vref1 is made higher than a normal voltage when the surroundings of the liquid crystal panel are brighter than an ordinary brightness. Conversely, the control reference voltage Vref1 is made lower than the normal voltage when the surroundings of the liquid crystal panel are darker than an ordinary brightness.

Therefore, in the case of transreflective type or a front-light of a reflective type when the surroundings of the liquid crystal panel are brighter than a normal brightness, the control reference voltage Vref1 is made lower than a normal voltage, and it is inputted in the error amplification circuit 3. The error amplification circuit 3 compares a detection voltage V1 at a unison connection point of the LED 8 and the resistance R1 with the control reference voltage Vref1, and outputs a control signal for reducing the constant current supplied by the power supply circuit 4 such that the detection voltage V1 concurs with the control reference voltage Vref1.

The power supply circuit 4 lowers its own output voltage Vout based on the output of the error amplifier circuit 3 such that the detection voltage V1 becomes the control reference voltage Vref1 that is lower man the normal voltage. As a result, the detection voltage V1 becomes the control reference voltage Vref1 that is lower than the normal voltage, and the current that flows in the LED 8 is reduced lower than the normal current, such that the amount of light emission of the LED 8 is reduced less than in the normal situation.

On the other hand, when the surroundings of the liquid crystal panel are darker than the normal brightness, the control reference voltage Vref1 is made higher than a normal voltage, and it is inputted in the error amplification circuit 3. The error amplification circuit 3 compares a detection voltage V1 at the common connection point of the LED 8 and the resistance R1 with the control reference voltage Vref1, and outputs a control signal for increasing the constant current supplied by the power supply circuit 4 such that the detection voltage V1 concurs with the control reference voltage Vref1.

The power supply circuit 4 elevates its own output voltage Vout based on the output of the error amplifier circuit 3 such that the detection voltage V1 becomes the control reference voltage Vref1 that is higher than the normal voltage. As a result, the detection voltage V1 becomes the control reference voltage Vref1 that is higher than the normal voltage, and the current that flows in the LED 8 is increased higher than the normal current, such that the amount of light emission of the LED 8 is increased more than in the normal situation.

Next, a description will be made as to the control to keep the amount of light emission at a predetermined value even when the temperature of the LED 8 in use changes.

The-band-gap reference circuit 5 generates a control reference voltage Vref2 defied by Expression (1), for example, according to the temperature of the LED 8 in use to compensate for the temperature dependency of the luminescent brightness of the LED 8, and this control reference voltage Vref2 is inputted in a (−) input terminal of the operation amplifier OP11.

For example, when the ambient temperature in which the liquid crystal panel is used in other words, the temperature of the LED 8 in use, becomes higher than the normal temperature, the luminous efficiency of the LED 8 is lowered and therefore the control reference voltage Vref2 is made higher than the normal voltage to compensate for the lowered luminous efficiency. Conversely, when the temperature of the LED 8 in use becomes lower than the normal temperature, the luminous efficiency of the LED 8 increases, and therefore the control reference voltage Vref2 is made lower than the normal voltage to compensate for the increased luminous efficiency.

When the temperature of the LED 8 in use becomes higher than the normal temperature, the control reference voltage Vref2 is made higher than the normal voltage, and the operation amplifier OP11 of the voltage-current conversion circuit 6 elevates a potential V2 at the common connection point of the MOS transistor Q2 and the resistance R2 to the elevated potential.

As a consequence, the current I=Vref2/R2 that flows in the resistance R2 of the voltage-current conversion circuit 6 increases, thereby compensating for the reduction in the current resulted from the elevated temperature. As the current increases, the driving current that flows in the LED 8 of the LED driving circuit 1 increases, and the luminescent brightness of the LED at this moment is made equal to that when the LED 8 is used in the normal temperature.

Accordingly, even when the temperature of the LED 8 in use becomes higher than the normal temperature, the amount of its light emission can be maintained at a level equal to that at the normal temperature.

On the other hand, when the temperature of the LED 8 in use becomes lower than the normal temperature, the control reference voltage Vref2 is made lower than the normal voltage, and the operation amplifier OP11 of the voltage-current conversion circuit 6 lower a potential V2 at the common connection point of the MOS transistor Q2 and the resistance R2 to the lowered potential.

As a consequence, the current I=Vref2/R2 that flows in the resistance R2 of the voltage-current conversion circuit 6 decreases, thereby compensating for the increase in the current resulted from the lowered temperature. As the current decreases, the driving current that flows in the LED 8 of the LED driving circuit 1 decreases, and the luminescent brightness of the LED at this moment is made equal to that when the LED 8 is used in the normal temperature.

Accordingly, even when the temperature of the LED 8 in use becomes lower than the normal temperature, the amount of its light emission can be maintained at a level equal to that at the normal temperature.

As described above, in accordance with the first embodiment, the current that flows in the LED that is used as a backlight is optimized according to the brightness of the surroundings when the liquid crystal display is used. As a result, when a battery is used as the power supply for the LED, the power consumption of the battery can be reduced, and the display quality of the liquid crystal panel can be improved. It is noted that allowable forward currents of the LED have a temperature lowering characteristic, and therefore the LED needs to be used within the range of allowable forward currents.

Also, in accordance with the first embodiment, the current that flows in the LED that is used as a backlight is optimized according to the temperature of the surroundings when the liquid crystal display is used. As a result, the energy of the driving power supply for the LED can be efficiently used, and the display quality of the liquid crystal panel can be improved.

It is noted that the first embodiment was described with reference to a case where there is one LED for the backlight. However, a plurality of LEDs may be provided; and by providing a plurality of LED driving circuits, the amount of light emission of each of the LEDs can be controlled by the LED 8 indicated in FIG. 1.

Next, a composition of a backlight control device of a liquid crystal display in accordance with a second embodiment of the present invention is described with reference to FIG. 3.

In the second embodiment, like the first embodiment, the amount of light emission of an LED, which is disposed as backlight at the back of a liquid crystal panel of a transmissive type or a transreflective type liquid crystal display, is controlled according to the brightness of the surroundings of the liquid crystal panel and the temperature of the LED in use.

Accordingly, as shown in FIG. 1, the second embodiment is equipped at least with an LED driving circuit 1, a control reference voltage generation circuit 2A, an error amplifier circuit (error amplifier) 3A, a power supply circuit 4, and a voltage-current conversion circuit 6A; and the power supply circuit 4 is connected to a power supply 7

Figure 3:
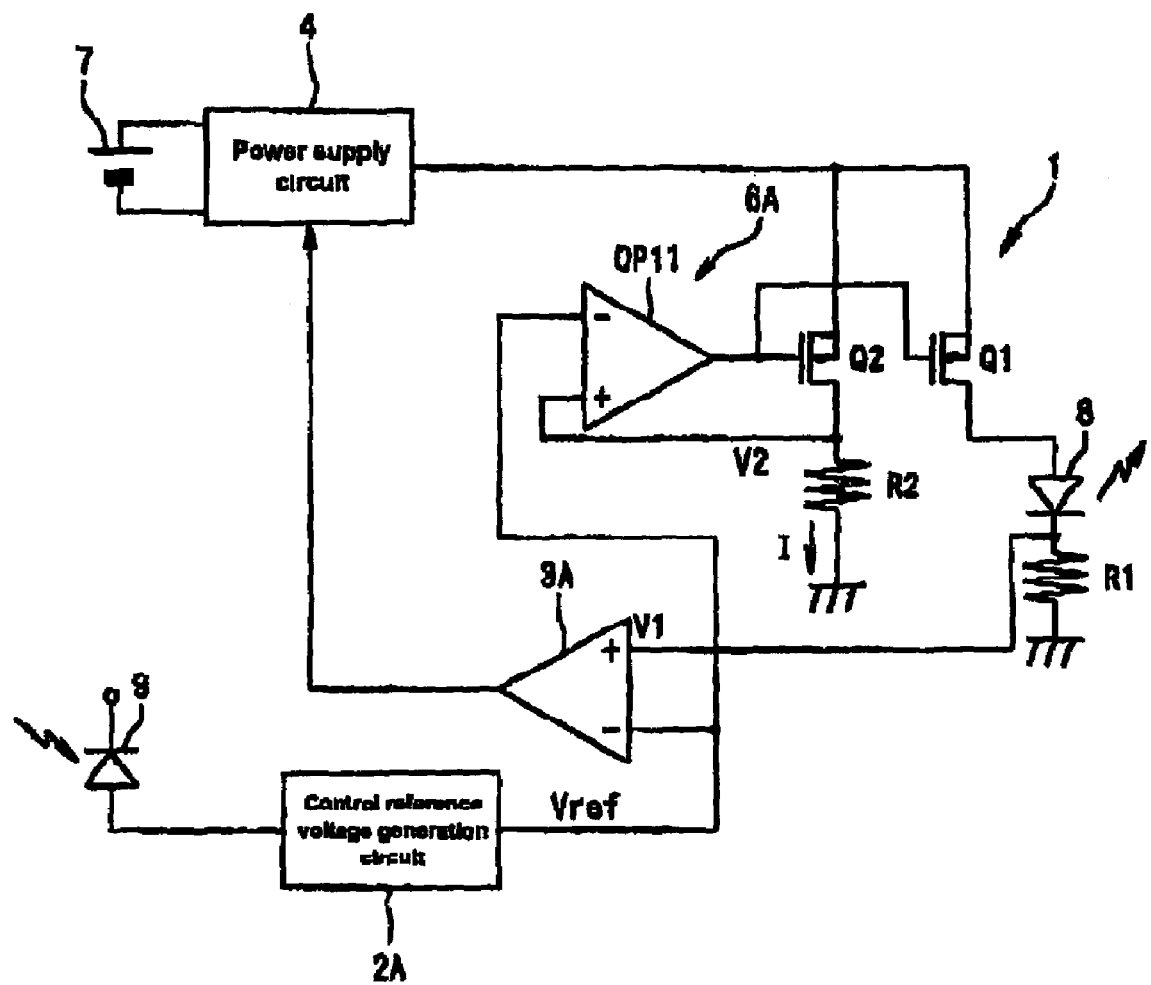
FIG. 3 shows a composition in accordance with a second embodiment of the present invention.

More specifically, in the second embodiment, the bandgap reference circuit 5 shown in FIG. 1 is omitted, and the control reference voltage generation circuit 2 of FIG. 1 is replaced with the control reference voltage generation circuit 2A as shown in FIG. 3.

The control reference voltage generation circuit 2A generates a control reference voltage Vref according to the brightness around the liquid crystal panel and according to a temperature characteristic of the luminescent brightness of the LED 8 in order to compensate for the temperature dependency of the luminescent brightness.

The control reference voltage Vref is supplied to a (−) input terminal of the error amplifier circuit 3A, and also supplied to a (−) input terminal of an operation amplifier OP11 of the voltage-current conversion circuit 6A.

The error amplifier circuit 3A is a circuit that compares a detection voltage V1 that is generated across both ends of a resistance R1 of the LED driving circuit 1 with the control reference voltage Vref that is generated by the control reference voltage generation circuit 2A, and outputs a signal for controlling a constant voltage that is supplied by the power supply circuit 4 such that the detection voltage V1 coincides with the control reference voltage Vref.

The voltage-current conversion circuit 6A is a circuit that converts the control reference voltage Vref that is generated by the control reference voltage generation circuit 2A to a predetermined constant current, and functions as a constant current source whose constant current is variable. The voltage-current conversion circuit 6A can be composed basically in the same manner as the voltage-current conversion circuit 6 shown in FIG. 1.

The composition of other parts of the second embodiment are the same as the composition of the first embodiment shown in FIG. 1. Therefore, common components are assigned the same reference numbers, and only different components are described in detail below.

First, the control reference voltage generation circuit 2A shown in FIG. 3 is described with reference to FIG. 4.

The control reference voltage generation circuit 2A is equipped, as shown in FIG. 4, with a current-voltage conversion circuit 11, a voltage amplifier circuit 12, a sample and hold circuit 13, a filter circuit 14 and a band-gap reference circuit 15, wherein an output of each of the current-voltage conversion circuit 11, the voltage amplifier circuit 12 and the sample and hold circuit 13 changes according to a reference voltage VR that is generated by the band-gap reference circuit 15.

The current-voltage conversion circuit 11 is a circuit that converts a current that flows in a tight receiving diode 9 according to the brightness of the surroundings of the liquid crystal panel to an alternate voltage, wherein the converted voltage changes according to the level of the brightness.

The voltage amplifier circuit 12 is a circuit that amplifies the converted alternate voltage from the current-voltage conversion circuit 11 and outputs the same.

The sample and hold circuit 13 is a circuit that takes in an output voltage from the voltage amplifier circuit 12 at a certain timing and holds the same for a predetermined period of time, in other words, a circuit that samples and holds the output voltage. When the output voltage of the voltage amplifier circuit 12 changes, the sample and hold circuit 13 provides an appropriate output voltage by appropriately accommodating the output change.

The filter circuit 14 is a circuit that smoothes out the output of the sample and hold circuit 13 and outputs the same.

The band-gap reference circuit 15 is a circuit that generates a reference voltage VR according to the temperature characteristics of the luminescent brightness of the LED 8 in order to compensate for the temperature dependency of the luminescent brightness thereof, and may have a composition indicated in FIG. 2, for example.

The reference voltage VR generated by the band-gap reference circuit 15 is supplied as a bias voltage for the current-voltage conversion circuit 11, the voltage amplifier circuit 12 and the sample and hold circuit 13. For this reason, the output of the voltage amplifier circuit 12 changes according to changes a the reserve voltage VR. Therefore, the control reference voltage Vref to be outputted from the filter circuit 14 changes according to the brightness of the surroundings of the liquid crystal display and can compensate for the temperature dependency of the luminescent brightness of the LED 8.

Next, a specific circuit structure of each of the sections of the control reference voltage generation circuit 2A shown in FIG. 4 is described with reference to FIG. 5.

As shown in FIG. 5, the current-voltage conversion circuit 11 is composed of an operation amplifier OP1, a resistance R11, a capacitor C1 and transistors T1 and T2, and generates an alternate voltage according to the brightness of the surroundings of the liquid crystal panel.

More specifically, the reference voltage VR from the band-gap reference circuit 15 is applied to a (+) input terminal of the operation amplifier OP1. A (−) input terminal of the operation amplifier OP1 is connected to an anode of the light receiving diode 9 through the transistor T1. Further, he transistor T2 is connected between the (−) input terminal and the (+) input terminal of the operation amplifier OP1 to thereby short-circuit the two terminals. Also, a parallel circuit in which the resistance R11 and the capacitor C1 are connected in parallel is connected between the (−) input terminal and an output terminal of the operation amplifier OP1.

The transistor T1 is controlled to be turned on and off by a control signal S2 provided from a phase adjusting circuit 16, and is turned on when the control signal S2 is at an H level. The transistor T2 is controlled to be turned on and off by a control signal S2 S1 provided from the phase adjusting circuit 16, and is turned on when the control signal S1 is at an L level (see FIG. 6).

As shown in FIG. 5, the voltage amplifier circuit 12 is composed of operation amplifiers OP2 and OP3, capacitors C2–C4 and resistances R12–R15, which amplifies the alternate output voltage from the current-voltage conversion circuit 11, and which is composed of an amplifier circuit of two-stage operation amplifiers.

More specifically, the operation amplifier OP2 bus a (+) input terminal to which the reference voltage VR from the band-gap reference circuit 15 it applied, and a (−) input terminal that is connected to an output terminal of the operation amplifier OP1 in the preceding stage through the capacitor C2 and the resistance R12 for cutting direct current components. A parallel circuit in which the resistance R13 and the capacitor C3 are connected in parallel is connected between the (−) input terminal and an output terminal of the operation amplifier OP2. The operation amplifier OP3 has a (+) input terminal to which the reference voltage VR from the band-gap reference circuit 15 is applied, and a (−) input terminal that is connected to the output terminal of the operation amplifier OP2 in the preceding stage through the resistance R14. A parallel circuit in which the resistance R15 and the capacitor C4 are connected in parallel is connected between the (−) input terminal and an output terminal of the operation amplifier OP3.

The voltage amplifier circuit 12 may be a logarithmic voltage amplifier circuit in which the resistance R15 is replaced with a diode, or a logarithmic voltage amplifier circuit in which the resistance R13 is replaced with a diode and the capacitor C2 is disposed before the resistance R14. A logarithmic amplification, instead of a linear amplification, creates a visual characteristic closer to the human visual characteristic.

The voltage amplifier circuit 12 is composed of two stages of operation amplifiers as described above, but may be composed of three stages of operation amplifiers. This is because, in a transmissive type or a transreflective type liquid crystal display, the phase of the control reference voltage Vref outputted from the filter circuit 14 needs to change according to the characteristics of the liquid crystal panel.

As shown in FIG. 5, the sample and hold circuit 13 is composed of operation amplifiers OP4, and OP5, a transistor T3 that is used as a switch and a capacitor C5.

More specifically, the operation amplifier OP4 has a (+) input terminal that is connected to the output terminal of the operation amplifier OP3 in the preceding stage, and a (−) input terminal and an output terminal thereof are directly connected to each other.

Also, the output terminal of the operation amplifier OP4 is connected to a (+) input terminal of the operation amplifier OP5 through the transistor T3, and the (+) input terminal of the operation amplifier OP5 is grounded through the capacitor C5. Furthermore, a (−) input terminal and an output terminal of the operation amplifier OP5 are directly connected to each other.

Figure 6:
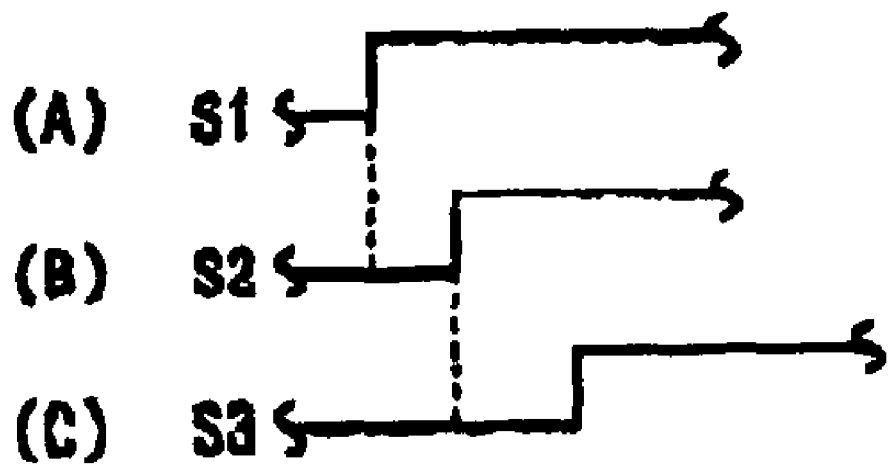
FIG. 6 shows an example of waveforms of control signals for controlling transistors T1–T3 shown in FIG. 5.

The transistor T3 is controlled to be turned on and off by a control signal S3 provided from the phase adjusting circuit 16, and is turned on when the control signal S3 is at an H level (see FIG. 6).

The filter circuit 14 is composed of a resistance R16 and a capacitor C6. More specifically, the resistance R16 has one end connected to the output terminal of the operation amplifier OP5, and the other end connected to one end of the capacitor C6. Also, the other end of the capacitor C6 is grounded, and a control reference voltage Vref is taken out from a common connection section of the capacitor C6 and the resistance R16.

Next, an example of operations of the second embodiment thus composed is described with reference to the accompanying drawings.

As shown in FIG. 3, since the MOS transistor Q2 of the voltage-current conversion circuit 6A and the MOS transistor Q1 of the LED driving circuit 1 compose a current mirror, a constant current flows in the MOS resistor Q1 according to the constant current I that flows in the MOS transistor Q2. As a result, the LED 8 is driven by the constant current.

The control reference voltage generation circuit 2A generates a control reference voltage Vref according to the brightness around the liquid crystal panel and according to a temperature characteristic of luminescent brightness of the LED 8 in order to compensate for the temperature dependency of the luminescent brightness.

The error amplifier circuit 3A composes a detection voltage V1 that is generated across both ends of the resistance R1 of the LED driving circuit 1 with the control reference voltage Vref, and outputs a signal for controlling a constant voltage that is supplied by the power supply circuit 4 such that the detection voltage V1 coincides with the control reference voltage Vref.

The error amplifier circuit 3A compares a detection voltage V1 that is generated across both ends of the resistance R1 with the control reference voltage Vref, and outputs a signal for controlling a constant current that is supplied by the power supply circuit 4 such that the detection voltage V1 coincides with the control reference voltage Vref.

The power supply circuit 4 elevates or lowers, based on an output from the error amplifier circuit 3A, its output voltage Vout such that the detection voltage V1 coincides with the control reference voltage Vref. The current that flows in the LED 8 increases or decreases according to changes of the output voltage Vout such that the amount of light emission of the LED 8 is controlled.

In the meantime, the control reference voltage Vref that is generated by the control reference voltage generation circuit 2A is supplied to the (−) input terminal of the operation amplifier OP11 of the voltage-current conversion circuit 6A. The control reference voltage Vref specifies a constant current I that flows in the MOS transistor Q2, in other words, a constant current I=Vref/R2 that flows in the resistance R2.

For this reason, the constant current I changes according to changes in the control reference voltage Vref, and changes in the constant current I change the current that flows in the MOS transistor Q1. As a result, the current that flows in the LED increases or decreases, such that the amount of light emission of the LED 8 is controlled.

Next, an outline of operations of the control reference voltage generation circuit 2A shown in FIG. 5 is described with reference to FIGS. 5 and 6.

In the control reference voltage generation circuit 2A, when the control signal S1 from the phase adjusting circuit 16 becomes an H level, as indicated in FIG. 6(A), the transistor T2 is turned off. Then, as indicated in FIG. 6(B), when the control signal S2 becomes an H level, the transistor T1 is turned on. Further, as indicated in FIG. 6(C), when the control signal S3 becomes an H level, the transistor T3 is turned on. The control signals S1–S3 repeat their rising and falling in a predetermined cycle.

As a result, the current that flows in the photodiode 9 is converted by the operation amplifier OP1 into an alternate voltage. An alternate signal voltage component of the converted alternate voltage is voltage-amplified by the operation amplifiers OP2 and OP3, and outputted to the sample and hold circuit 13. The sample and hold circuit 13 performs a sampling and holding operation according to an on and off operation of the transistor T3, and an output thereof is smoothed by the filter circuit 14. As a result, a control reference voltage Vref as indicated in FIG. 5 is retrieved from the filter circuit 14.

As described above, in accordance with the second embodiment, the amount of light emission of the LED is controlled according to the brightness of the surroundings and the temperature thereof in use when the liquid crystal display is used. Accordingly, the display quality of the liquid crystal panel can be improved regardless of differences in the brightness of the surroundings and differences in the temperature in use.

Next a composition of a backlight control device of a liquid crystal display in accordance with a third embodiment of the present invention is described with reference to FIG. 7.

In the third embodiment, like the second embodiment, the amount of light emission of an LED, which is disposed as backlight at the back of a liquid crystal panel of a transmissive type or a transreflective type liquid crystal display, is controlled according to the brightness of the surroundings of the liquid crystal panel and the temperature of the LED in use. It differs from the second embodiment in that light emission of a plurality of LEDs can be controlled.

Figure 7:
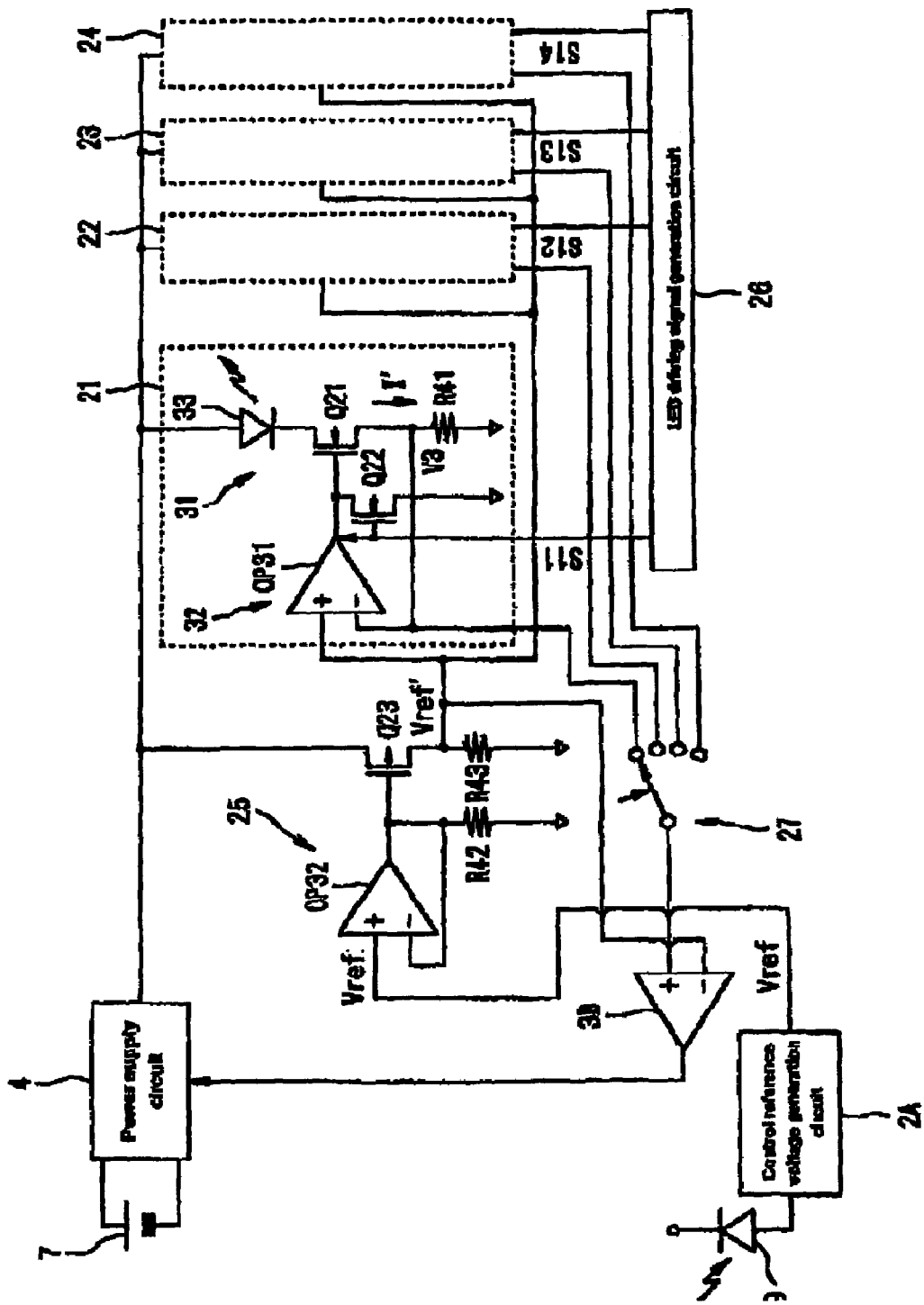
FIG. 7 shows a composition in accordance with a third embodiment of the present invention.

For this reason, as shown in FIG. 7, the third embodiment is equipped at least with a plurality of LED driving control sections 21–24, a control reference voltage generation circuit 2A, an error amplifier circuit 3B, a power supply circuit 4, a control reference voltage level conversion circuit 25, an LED driving signal generation circuit 26, and a selection switch 27.

The LED driving control sections 21–24 have the same structure, and therefore only the structure of the LED driving control section 21 is described.

The LED driving control section 21 is composed of, as indicated in FIG. 7, an LED driving circuit 31 that drives an LED 33 and a current control circuit 32 that controls the driving current for the LED 33.

The LED driving circuit 31 is composed of a circuit in which the LED 33, a MOS transistor Q21 and a resistance R41 are serially connected. One end of the circuit is connected to an output line of the power supply circuit 4 and the other end thereof is grounded.

Also, a MOS transistor Q22, which is controlled to be turned on and off by an LED driving signal S11 from the LED driving signal generation circuit 26, is connected between a gate of the MOS transistor Q21 and the ground. In other words, by controlling the MOS transistor Q22 to be turned on and off, the MOS transistor Q21 is controlled to be turned on and off.

The current control circuit 32 is a circuit that controls a constant current that flows in the LED 33 based on a control reference voltage Vref' whose level has been converted by the control reference voltage level conversion circuit 25.

Accordingly, the current control circuit 32 is composed of, as indicated in FIG. 7, an operation amplifier OP31. The operation amplifier OP31 has a (+) input terminal to which a control reference voltage Vref' is applied, and a (−) input terminal to which a potential V3 at a common connection section of the MOS transistor Q21 and the resistance R41 is applied. An output terminal of the operation amplifier OP31 is connected to a gate of the MOS transistor Q21.

Due to the composition described above, the control reference voltage Vref at the (+) input terminal of the operation amplifier OP31 becomes equal to the potential V3 at the common connection section of the MOB transistor Q21 and the resistance R41, such that a constant current I' that flows in the LED 33 is controlled be I'=Vref'/R41.

The control reference voltage generation circuit 2A generates a control reference voltage Vref according to the brightness around the liquid crystal panel and according to a temperature characteristic of luminescent brightness of the LED 33 in order to compensate for the temperature dependency of the luminescent brightness thereof. More specifically, the control reference voltage generation circuit 2A may be structured, for example, as shown in FIGS. 4 and 5

The error amplifier circuit 3B selectively inputs through the selection switch 27 the voltage V3 that is generated across both ends of the resistance R41 of the LED driving circuit 31 in each of the LED driving control sections 21–24.

The error amplifier circuit 3B is a circuit that compares each of the selectively inputted voltages V3 with the control reference voltage Vref of the control reference voltage generation circuit 2A, and outputs a control signal for controlling a constant current that is supplied by the power supply circuit 4 such that the detection voltage V3 coincides with the control reference voltage Vref'.

The power supply circuit 4 is capable of controlling its output voltage Vout based on the output from the error amplifier circuit 3B such that the detection voltage V3 that is generated across both ends of the resistance R41 of each of the LED driving control sections 21–24 coincides with the control reference voltage Vref'.

The control reference voltage level conversion circuit 25 is a circuit that converts the control reference voltage Vref generated by the control reference voltage generation circuit 2A to a control reference voltage Vref' at a lower level. The converted control reference voltage Vref' is supplied to the (+) input terminal of the operation amplifier OP31 of the voltage-current conversion circuit 32 and to the (−) input terminal of the error amplifier circuit 3B.

More specifically, as shown in FIG. 7, the control reference voltage level conversion circuit 25 is composed of an operation amplifier OP32, a MOS transistor Q23 and resistances R42 and R43.

The operation amplifier OP32 has a (+) input terminal to which the control reference voltage Vref generated by the control reference voltage generation circuit 2A is applied, and a (−) input terminal that is connected to its output terminal. Also, the output terminal of the operation amplifier OP32 is connected to a gate of the MOS transistor Q23 and is grounded through a resistance R42.

The MOS transistor Q23 has a source that is connected to an output line of the power supply circuit 4 and a drain that is grounded through a resistance R43. A common connection section of the drain of the MOS transistor Q23 and the resistance R43 is connected to a (−) input terminal of the error amplifier circuit 3B, and also connected to a (+) input terminal of the operation amplifier OP31 of each of the LED driving control section 21–24.

Figure 8:
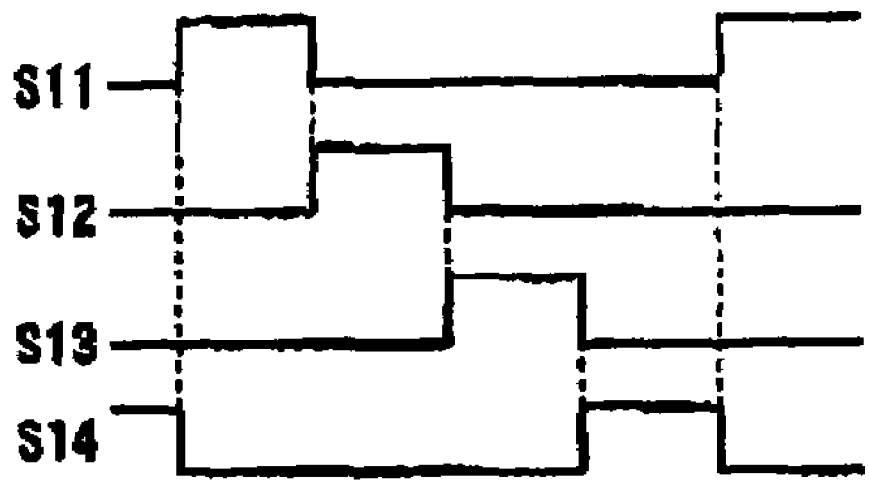
FIG. 8 shows an example of waveforms of LED driving signals S11–S14 generated by an LED driving signal generation circuit shown in FIG. 7.
Figure 9:
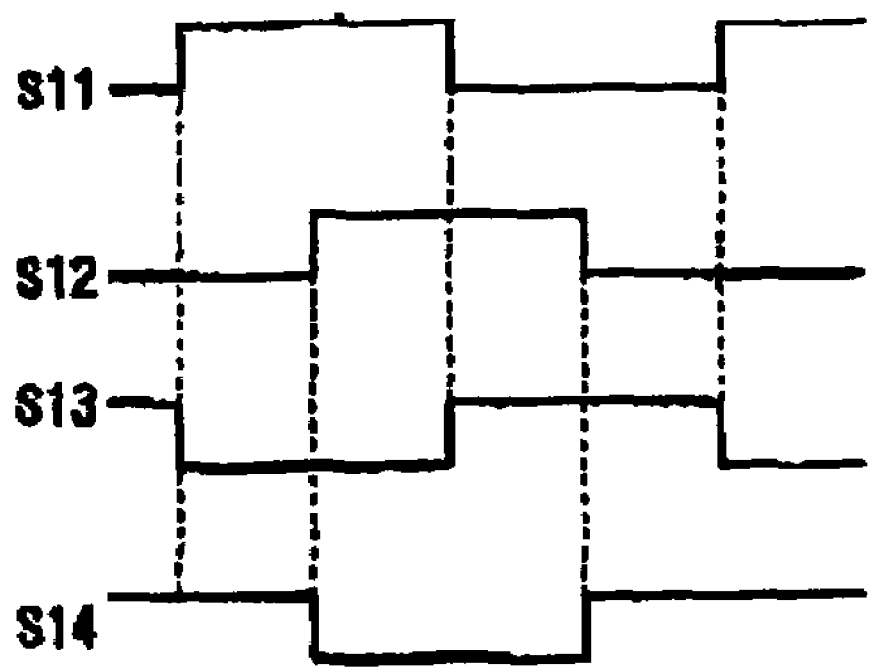
FIG. 9 shows another example of waveforms of LED driving signals S11–S14 generated by an LED driving signal generation circuit shown in FIG. 7.

The LED driving signal generation circuit 26 is a circuit that controls to turn on and off the MOS resistor Q22 of each of the LED driving control sections 21–24, and generates LED driving signals S11–S14 that control outputs of the operation amplifiers OP31, respectively. More specifically, the LED driving signals S11–S14 as shown in FIG. 8 or FIG. 9 are generated.

Next, an example of operations of the third embodiment thus composed is described with reference to FIGS. 7–9.

The control reference voltage generation circuit 2A generates a control reference voltage Vref according to the brightness around the liquid crystal panel and according to a temperature characteristics of the luminescent brightness of the LED 33 in order to compensate for the temperature dependency of the luminescent brightness thereof, and outputs the control reference voltage Vref to the control reference voltage level conversion circuit 25.

The control reference voltage Vref generated by the control reference voltage generation circuit 2A is converted by the control reference voltage level conversion circuit 25 to a control reference voltage Vref' at a lower level. The converted control reference voltage Vref' is supplied to the (+) input terminal of the operation amplifier OP31 of each of the LED driving control sections 21–24, and also to the (−) input terminal of the error amplifier circuit 3B.

The control reference voltage Vref' specifies a constant current I' that flows in the MOS transistor Q21, in other words, a constant current I'=Vref'/R41 that flows in the resistance R41. For this reason, the constant current I' clangs according to changes in the control reference voltage Vref'. As a result, the current that flows in the LED 33 increases or decreases, such that the amount of light emission of the LED 8 is controlled.

In the meantime, the voltage V3 that is generated across both ends of the resistance R41 of the LED driving circuit 31 in each of the LED driving control sections 21–24 is selectively inputted to the error amplifier circuit 3B through the selection switch 27.

The error amplifier circuit 3B compares each of the selectively inputted voltages V3 with the control reference voltage Vref' of the control reference voltage generation circuit 2A, and outputs a control signal for controlling a constant current that is supplied by the power supply circuit 4 such that the detection voltage V3 coincides with the control reference voltage Vref'.

As a result, the power supply circuit 4 elevates or lowers, based on an output from the error amplifier circuit 3B, its output voltage Vout such that each of the detection voltages V3 coincides with the control reference voltage Vref'. By the changes in the output voltage Vout, the current that flows in the LED 33 in each of the LED driving control sections 21–24 increases or decreases according to changes of the output voltage Vout such that the amount of light emission of each of the LEDs 33 is controlled.

Further, together with these controls described above, the MOS transistor Q21 in each of the LED driving control sections 21–24 is controlled to be turned on and off in a manner described below, such that the lighting of each of the LEDs 33 is controlled accordingly.

In other words, the LED driving signal generation circuit 26 generates LED driving signals S11–S14 having different phases (operating timings) as indicated in FIG. 8 or FIG. 9, which are supplied to the gates of the MOS transistors 22 in the LED driving control sections 21–24, respectively.

For this reason, when the LED driving signal S11–S14 are at an H level, the output of the OP 31 has a high impedance such that the MOS transistor Q22 turns on, and the gate of the MOS transistor Q21 turns at an L level such that the MOS transistor Q21 turns off.

On the other hand, when the LED driving signals S11–S14 are at an L level, the MOS transistor Q22 turns off, and an output from the operation amplifier OP31 is inputted in the gate of the MOS transistor Q21 such that the MOS transistor Q21 turns on.

As a result, according to the LED driving signals S11–S14, the MOS transistors A21 successively turn on, and these operations are repeated. As a consequence, the LEDs 33 of the LED driving control sections 21–24 are successively turned on, and the lighting operations thereof are repeated.

As described above, in accordance with the third embodiment the amount of light emission of the LEDs is controlled according to the brightness of the surroundings and the temperature thereof in use when the liquid crystal display is used. Accordingly, the display quality of the liquid crystal panel can be improved regardless of differences in the brightness of the surroundings and differences in the temperature in use.

Furthermore, in accordance with the third embodiments a plurality of LEDs are provided, and the plurality of LEDs are turned on by LED driving signals having different phases such that the driving current for driving the plurality of LEDs is reduced. The embodiment examples are those that use 4 LEDs and the on duty of the LED is 25% (FIG. 8) and 50% (FIG. 9).

For this reason, when the power supply circuit is composed of a DC/DC converter, a voltage drop at this section is reduced and thus the power loss is reduced, which can increase the power supply conversion efficiency. Furthermore, currents of the power supply circuit for driving LEDs can be averaged.

Next, a composition of a backlight control device of a liquid crystal display in accordance with a fourth embodiment of the present invention is described with reference to FIG. 10.

In the fourth embodiment, the amount of light emission of an LED, which is disposed as backlight at the back of a liquid crystal panel (not shown) of a transmissive type or a transreflective type liquid crystal display, is automatically controlled to be at a predetermined value even when the temperature of the LED in use changes.

Figure 10:
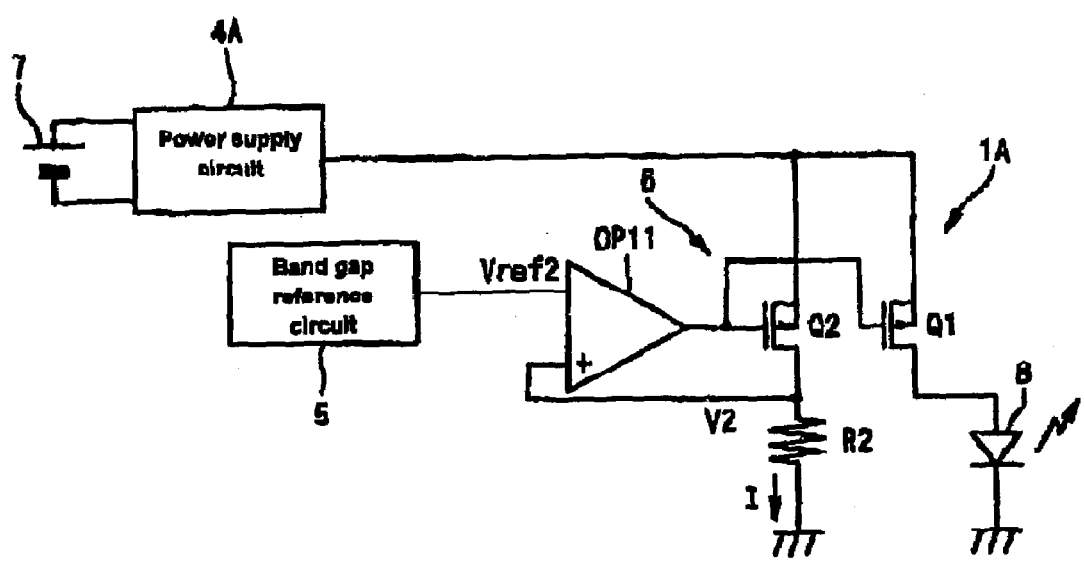
FIG. 10 shows a composition in accordance with a fourth embodiment of the present invention.

For this, as shown in FIG. 10, the fourth embodiment is equipped with an LED driving circuit 1A, a band-gap reference circuit 5, and a voltage-current conversion circuit 6, wherein the LED driving circuit 1A and the voltage-current conversion circuit 6 are driven by a power supply circuit 4A.

As shown in FIG. 10, the LED driving circuit 1A flows a driving current to an LED 8 to have the LED 8 emit light. For this, the LED driving circuit 1A is composed of a circuit in which a P-type MOS transistor Q1 and the LED 8 are serially connected; and one end of the circuit is connected to an output line of the power supply circuit 4A and the other end is grounded.

The band-gap reference circuit 5 is a circuit that generates a control reference voltage Vref2 according to the temperature characteristics of the LED 8 in order to compensate for the temperature dependency of the luminescent brightness thereof, and may have a composition indicated in FIG. 2, for example.

The voltage-current conversion circuit 6 is a circuit that converts the control reference voltage Vref2 that is generated by the band-gap reference circuit 5 to a predetermined constant current, and functions as a constant current source whose constant current is variable.

For is reason, the voltage-current conversion circuit 6 is composed in a similar manner as that of the voltage-current conversion circuit 6 shown in FIG. 1. In other words, by utilizing the fact that the control reference voltage Vref2 applied to a (−) input terminal of the operation amplifier OP11 is equal to a potential V2 at a common connection point between the MOB transistor Q2 and the resistance R2, a constant current I=Vref2/R2 is generated.

Also, the MOS transistor Q2 and the MOS transistor Q1 are in a relation of a current mirror, the current that flows in the MOS transistor Q1 follows the constant current I that flows in the MOS transistor Q2.

The power supply circuit 4A is composed of, for example, a charge pump type DC-DC converter, wherein the voltage of the power supply 7 is stepped up to an appropriate voltage, and this voltage is retrieved as an output voltage Vout, which is then supplied to the LED driving circuit 1A and the voltage-current conversion circuit 6.

Operations of the fourth embodiment thus composed are the same as the operations of the LED driving circuit 1 and the voltage-current conversion circuit 6 in the first embodiment shown in FIG. 1, and have already been described. Accordingly, the operations of the fourth embodiment are omitted.

As described above, in the fourth embodiment, the current that flows in the LED as backlight is optimized according to the temperature of the surroundings when the liquid crystal display is used. For this reason, the energy of the driving power supply for the LED can be efficiently used, and the display quality or the liquid crystal panel can be improved.

As described above, in accordance with the present invention, the current that flows in the LED used as a backlight can be optimized regardless of the differences in the brightness of the surroundings when the liquid crystal display is used. Therefore, when the driving power supply for the LED is a battery, the power consumption of the battery can be reduced, and the display quality of the liquid crystal panel is improved.

Also, in accordance with the present invention, the luminous efficiency of the LED used as a backlight can be optimized regardless of the differences in the temperature of the surroundings when the liquid crystal display is used. Therefore, the energy of the driving power supply for the LED can be efficiently used, and the display quality of the liquid crystal panel can be improved.

Furthermore, the display quality of the liquid crystal panel can be improved regardless of the differences in the brightness of the surroundings or differences in the temperature of the LED when the liquid crystal display is used.

Moreover, in accordance with the present invention, lighting of a plurality of LEDs is controlled with LED driving signals having different phases. As a result, in this case, the conversion efficiency at the time of driving the LEDs can be improved, and the currents of the power supply circuit for driving the LEDs can be averaged.

What is claimed is:

1. A backlight control device for a liquid crystal display that is a transmissive type or a transreflective type liquid crystal display equipped with an LED as a backlight, comprising:

an LED driving circuit that is connected to a power supply circuit and drives the LED; and a current control device that detects brightness around the liquid crystal display and controls a driving current for the LED according to the detection, wherein the current control device is equipped with a control reference voltage generation device that generates a control reference voltage according to brightness around the liquid crystal display, and an error amplifier circuit that generates a signal representing a difference between a detection voltage according to the drive current of the LED and the control reference voltage generated by the control reference voltage generation circuit, and the power supply circuit varies an output voltage thereof according to an output of the error amplifier circuit.

2. A backlight control device for a liquid crystal display according to claim 1, wherein the control reference voltage generation circuit is equipped at least with a current-voltage conversion circuit that converts a current that flows according to brightness around the liquid crystal display to a voltage, an amplification circuit that amplifies the voltage converted by the current-voltage conversion circuit, and a sample and hold circuit that samples and holds an output voltage of the amplification circuit.

3. A backlight control device for a liquid crystal display that is a transmissive type or a transreflective type liquid crystal display equipped with an LED as a backlight, comprising:

an LED driving circuit that is connected to a power supply circuit and drives the LED;

a first current control device that detects brightness around the liquid crystal display and controls a driving current of the LED according to the detection; and a second current control device that, for compensating for temperature dependency of luminescent brightness of the LED, controls a driving current of the LED according to temperature characteristic of the luminescent brightness, wherein the first current control device is equipped with a first control reference voltage generation circuit that generates a first control reference voltage according to brightness around the liquid crystal display, and an error amplifier circuit that generates a signal representing a difference between a detection voltage generated according to the drive current of the LED and the control reference voltage generated by the first control reference voltage generation circuit, and the power supply circuit varies an output voltage thereof according to an output of the error amplifier circuit.

4. A backlight control device for a liquid crystal display according to claim 3, wherein the second current control device is equipped with a second control reference voltage generation circuit that, for compensating for temperature dependency of luminescent brightness of the LED, generates a second control reference voltage according to temperature characteristic of the luminescent brightness of the LED, and a voltage-current conversion circuit that converts the second control reference voltage of the second control reference voltage generation circuit to a predetermined current, and the LED driving circuit drives the LED by a driving current according to the predetermined current that is converted by the voltage-current conversion circuit.

5. A backlight control device for a liquid crystal display according to claim 3 or claim 4, wherein the first control reference voltage generation circuit is equipped at least with a current-voltage conversion circuit that converts a current that flows according to brightness around the liquid crystal display to a voltage, an amplification circuit that amplifies the voltage converted by the current-voltage conversion circuit, and a sample and hold circuit that samples and holds an output voltage of the amplification circuit.

6. A backlight control device for a liquid crystal display according to claim 4 or claim 5, wherein the second control reference voltage generation circuit is composed of a band-gap reference circuit.

7. A backlight control device for a liquid crystal display that is a transmissive type or a transreflective type liquid crystal display equipped with an LED as a backlight, comprising:

an LED driving circuit that is connected to a power supply circuit and drives the LED;

a control reference voltage generation circuit that is responsive to brightness around the liquid crystal display, and for compensating for temperature dependency of luminescent brightness of the LED, generates a control reference voltage according to temperature characteristic of the luminescent brightness;

an error amplifier circuit that generates a signal representing a difference between a detection voltage generated according to a drive current of the LED and the control reference voltage generated by the control reference voltage generation circuit; and a voltage-current conversion circuit that converts the control reference voltage to a predetermined current, wherein the power supply circuit varies an output voltage thereof according to an output of the error amplifier circuit, and the LED driving circuit drives the LED by a driving current according to the predetermined current that is converted by the voltage-current conversion circuit.

8. A backlight control device for a liquid crystal display according to claim 7, wherein the control reference voltage generation circuit is equipped at least with a current-voltage conversion circuit that converts a current that flows according to brightness around the liquid crystal display to a voltage, an amplification circuit that amplifies the voltage converted by the current-voltage conversion circuit, a sample and hold circuit that samples and holds an output voltage of the amplification circuit, and a band-gap reference circuit that generates a temperature-dependent reference voltage, wherein outputs of the respective current-voltage conversion circuit, the amplification circuit and the sample and hold circuit are changed according to the reference voltage generated by the band-gap reference circuit.

9. A backlight control device for a liquid crystal display that is a transmissive type or a transreflective type liquid crystal display equipped with LEDs as a backlight, comprising:

a plurality of LED driving circuits that are connected to a power supply circuit and drive the corresponding respective plurality of LEDs;

a control reference voltage generation circuit that is responsive to brightness around the liquid crystal display, and for compensating for temperature dependency of luminescent brightness of each of the LEDs, generates a control reference voltage according to temperature characteristic of the luminescent brightness;

a control reference voltage level conversion circuit that converts the control reference voltage generated by the control reference voltage generation circuit to a lower level voltage and outputs the same;

an error amplifier circuit that generates a signal representing a difference between each detection voltage generated according to each drive current of each of the LEDs of the respective LED driving circuits; and a plurality of current control circuits that each converts the control reference voltage converted by the control reference voltage level conversion circuit to a predetermined current, and controls the drive current of each of the LEDs of the respective LED driving circuits to assume the predetermined current, wherein the power supply circuit varies an output voltage thereof according to an output of the error amplifier circuit.

10. A backlight control device for a liquid crystal display according to claim 9, wherein the control reference voltage generation circuit is equipped at least with a current-voltage conversion circuit that converts a current that flows according to brightness around the liquid crystal display to a voltage, an amplification circuit that amplifies the voltage converted by the current-voltage conversion circuit, a sample and hold circuit that samples and holds an output voltage of the amplification circuit, and a band-gap reference circuit that generates a temperature-dependent reference voltage, wherein outputs of the respective current-voltage conversion circuit, the amplification circuit and the sample and hold circuit are changed according to the reference voltage generated by the band-gap reference circuit.

11. A backlight control device for a liquid crystal display according to claim 9 or claim 10, wherein the LEDs of the plurality of LED driving circuits are successively driven by drive signals having different phases.

12. A backlight control device for a liquid crystal display, comprising:
a light emitting diode (LED) driving circuit that is connected to a power supply circuit and drives the LED; and
means for detecting brightness around the liquid crystal display and controlling a driving current for the LED according to the detected brightness,
wherein the means for detecting is equipped with a control reference voltage generation circuit that generates a control reference voltage according to the brightness around the liquid crystal display, and an error amplifier circuit that generates a signal representing a difference between a detection voltage according to the driving current for the LED and the control reference voltage generated by the control reference voltage generation circuit, and the power supply circuit varies an output voltage thereof according to an output of the error amplifier circuit.

13. The backlight control device for a liquid crystal display according to claim 12, wherein the control reference voltage generation circuit is equipped at least with a current-voltage conversion circuit that converts a current that flows according to brightness around the liquid crystal display to a voltage, an amplification circuit that amplifies the voltage converted by the current-voltage conversion circuit, and a sample and hold circuit that samples and holds an output voltage of the amplification circuit.

* * * * *